Patented Sept. 5, 1922.

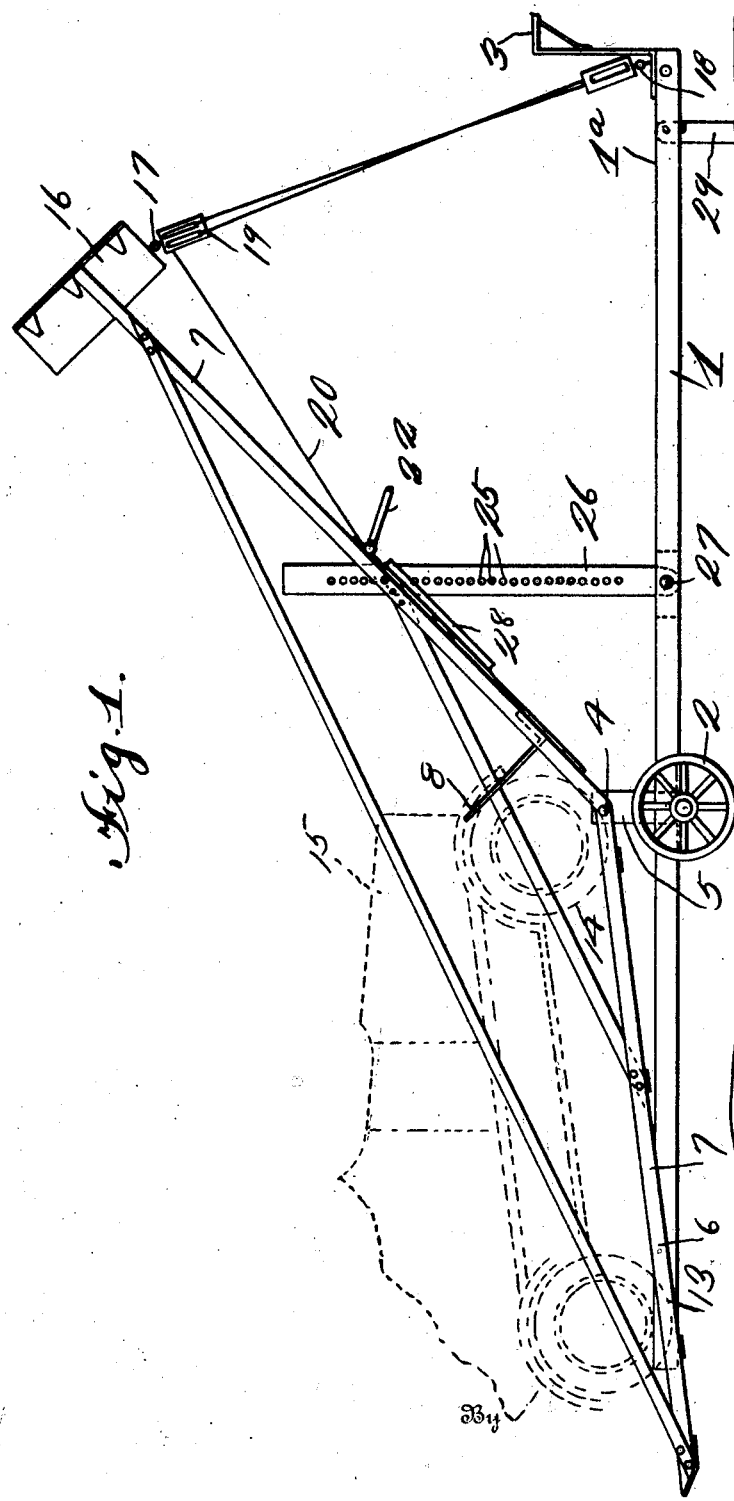

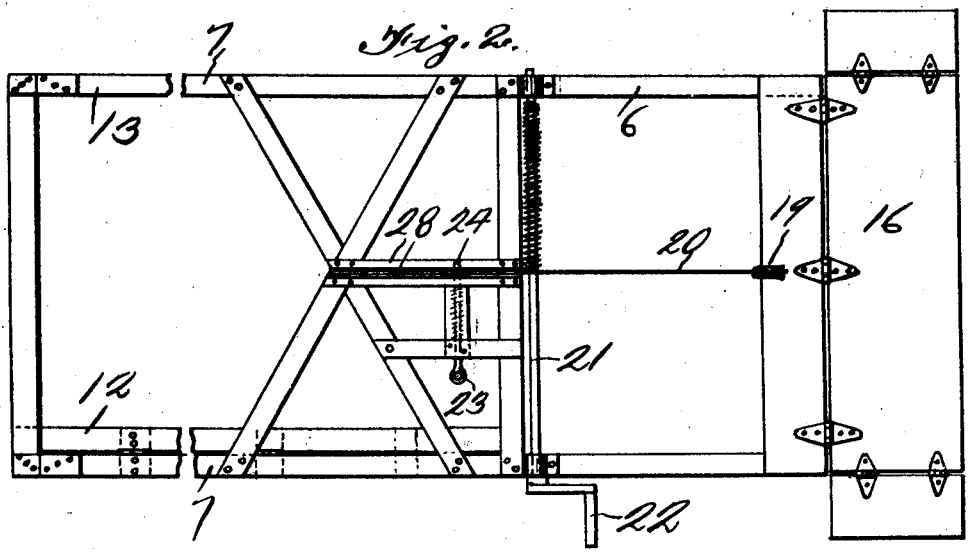
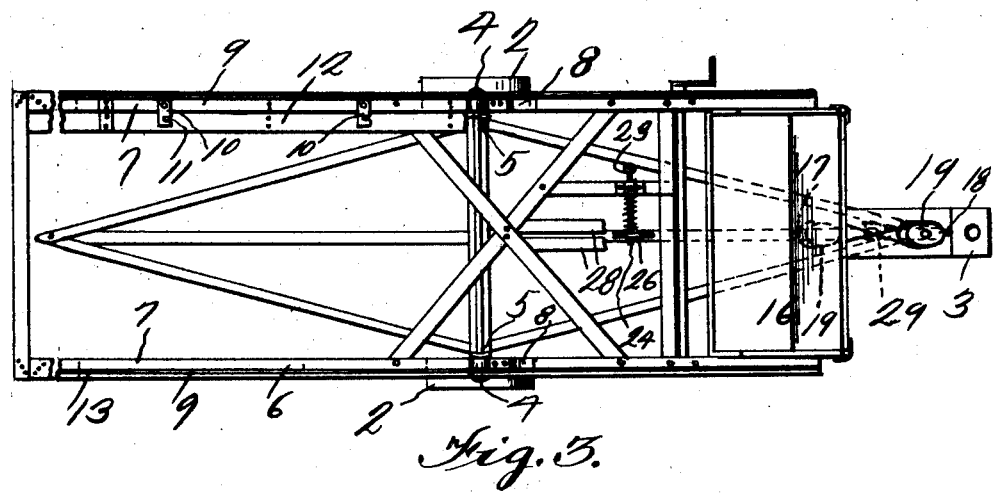

1,428,383

UNITED STATES PATENT OFFICE.

THOMAS A. MARTIN, OF WASHINGTON, DISTRICT OF COLUMBIA.

AUTOMOBILE HOIST.

Application filed September 21, 1921. Serial No. 502,187.

*To all whom it may concern:*

Be it known that I, THOMAS A. MARTIN, a citizen of the United States, residing at Washington, in the District of Columbia, have invented a new and useful Automobile Hoist; and I do hereby declare the following to be a full, clear, and exact description of the invention, such as will enable others skilled in the art to which it appertains to make and use the same.

The invention relates to automobile hoists and has for its object to provide a tiltable counterweighted automobile receiving frame, which frame is mounted on a wheel supported base and tiltable through the means of a rotatable drum carried by the frame and around which drum the lead of a rope from a block and fall extend, said block and fall having one of its blocks connected to the tiltable frame and its other block connected to the wheel supported base. A further object is to provide a spring actuated detent which detent cooperates with anyone of a plurality of apertures in a vertically disposed pivoted bar carried by the wheel supported frame said detent forming means for holding the tiltable frame in any position to which it may be moved.

A further object is to provide a tiltable frame on which the motor driven vehicle may be disposed and tilted to a position where the underside thereof will be readily accessible for repair purposes. A further object is to provide a combined automobile tilting device and trailer on which automobiles may be tilted or conveyed bodily from place to place, for instance in case of accident to the automobile, where one of the automobile wheels is broken or the automobile damaged in such a manner that it cannot be towed or run of its own power, said automobile may be placed on the device and moved to any desired place.

With the above and other objects in view the invention resides in the combination and arrangement of parts as hereinafter set forth, shown in the drawings, described and claimed, it being understood that changes in the precise embodiment of the invention may be made within the scope of what is clamed without departing from the spirit of the invention.

In the drawings:—

Figure 1 is a side elevation of the hoist.

Figure 2 is a bottom plan view of the tiltable platform.

Figure 3 is a top plan view of the hoist.

Referring to the drawings, the numeral 1 designates the base of the hoist, which base is preferably diamond shaped and is supported substantially centrally thereof by wheels 2, and on which wheels the base and hoist as a whole may be moved from place to place, particularly when the hoist has disposed thereon an automobile, which has been damaged in such a manner that it cannot be transported from place to place under its own power, or trailed. The forward end 1ᵃ of the base 1 is provided with a member 3, which member may be attached to a repair wagon or trailer vehicle in any suitable manner for transporting the hoist as a whole on the supporting wheels 2. Pivotally mounted at 4 on upwardly extending brackets 5 carried by the base 1 is a tiltable vehicle receiving base 6, on which base a vehicle is received in such a manner that its wheels will rest on the runways 7 and its front or rear wheels against arms 8 carried by the side rails 9 of the base 6. One of the side rails 9 is provided with pivoted arms 10, which arms engage headed pins 11 carried by an auxiliary wheel receiving bar 12, thereby allowing the base 6 to receive the wheels of vehicles of different widths. It will be seen that the weight of the vehicle is disposed on the forward end 13 of the base 6 with its wheel 14 in engagement with the arm 8, and its engine compartment 15 disposed adjacent a position over the pivotal point of the wheel supported base 1. When the vehicle receiving base 6 is tilted on the pivotal points 4 the weight of the automobile will be thrown closer to the center of the tiltable base, however to assist in the tilting action and partially counterweight the tiltable base 6, the rear end 7 of the tiltable base is provided with a foldable weight box 16, in which box weights may be disposed for counterbalancing the tiltable base. Connected at 17 to the under side of the box 16 and at 18 to the end 1ᵃ of the base 1 is a block and fall 19. The free end 20 of the cable which leads from said block and falls extends around a drum 21, which drum is provided with a handle 22 whereby the drum may be rotated and a downward pull imparted on the end 7 of the tiltable base 6 thereby tilting the pivotal base to a position where a vehicle disposed thereon will be raised clear of the ground and allowed to be transported, or the vehicle be so positioned and tilted that a mechanic may see and easily work on its lower mechanism.

During the tilting operation a spring actuated detent 23 has its end 24 out of engagement with any of the apertures 25 in a vertically disposed bar 26, which bar is pivotally connected at 27 to the base 1 and extends upwardly between spaced guide bars 28 carried by the pivotal base 6. After the tiltable base 6 has been tilted to the desired angle, the end 24 of the detent 23 is allowed to enter one of the apertures 25 in the bar 26, thereby holding the tiltable base 6 in any position to which it may be moved. By forming the base 1 substantially diamond shaped and the base 6 which supports the vehicle rectangular shaped, and having its vehicle receiving end extending beyond the end of the base 1, it will be seen that a vehicle may be easily run onto the frame 6 without interfering with the base 1, also that the vehicle receiving end of the base 6 may be positioned in engagement with the ground, for facilitating the vehicle receiving operation.

From the above it will be seen that an automobile transporting and tilting hoist is provided, which is simple in construction, and one wherein the parts are reduced to a minimum and the operation is positive. It is to be understood that the device may be built from metal bars or from any other material. However for purposes of illustration the parts are shown as formed from angle iron.

Pivoted to the end 1ª of the base 1 are supporting legs 29, which legs when positioned as shown in Figure 1 will maintain the base 1 in a horizontal plane. However when the automobile is being transported from place to place the legs 29 are preferably pivoted upwardly where they will be out of the way of obstructions when the hoist is being used for transporting the damaged vehicle.

The invention having been set forth what is claimed as new and useful is:—

1. An automobile transporting and tilting device comprising a wheel supported diamond shaped frame, a tiltable frame pivoted to the wheel supported frame, said tiltable frame being provided with a weight receptacle adjacent one of its ends, a block and fall connected to the tiltable frame at its weight end and to the wheel supported frame, a rotatable drum carried by the tiltable frame and around which drum the lead of the block and fall extends, and a detent carried by the tiltable frame and cooperating with an apertured pivoted bar extending upwardly from the wheel supported frame between guides in the tiltable frame and forming means for holding the tiltable frame in any position to which it may have been tilted.

2. An automobile transporting and tilting device comprising a wheel supported diamond shaped frame, a tiltable rectangular shaped vehicle receiving frame pivoted to the wheel supported frame and having one of its ends extending beyond one end of the diamond shaped frame, thereby allowing a vehicle to be disposed on said frame, one end of said rectangular shaped frame being provided with a weight receiving receptacle for the receipt of weights, a block and fall connected to the tiltable frame and the wheel supported frame adjacent their ends and provided with a lead line, said lead line extending around a rotatable drum carried by the tiltable rectangular shaped frame, and a detent for holding the tiltable frame in any position to which it may be moved.

In testimony whereof I have signed my name to this specification in the presence of two subscribing witnesses.

THOMAS A. MARTIN.

Witnesses:
HENRY BENNET,
E. C. BARBER.